United States Patent [19]
Pelin

[11] 3,891,243

[45] June 24, 1975

[54] AUTOMATIC ROUTE INFORMATION DISPLAY

[76] Inventor: Charles Pelin, P.O. Box 98245, Eastsound, Wash.

[22] Filed: July 2, 1973

[21] Appl. No.: 375,629

Related U.S. Application Data

[62] Division of Ser. No. 265,647, June 23, 1972.

[52] U.S. Cl. .................................. 283/35; 40/42
[51] Int. Cl.² .................................. G09B 22/00
[58] Field of Search ................. 283/34, 35; 40/42

[56] References Cited
UNITED STATES PATENTS

| | | | |
|---|---|---|---|
| 770,350 | 9/1904 | Carter | 283/34 |
| 965,159 | 7/1910 | Cullman | 283/34 |
| 2,635,372 | 4/1953 | Field | 40/42 |
| 3,618,240 | 10/1971 | Pelin | 40/42 |

Primary Examiner—Lawrence Charles
Attorney, Agent, or Firm—Christensen, O'Connor, Garrison & Havelka

[57] ABSTRACT

The device employs a pair of elongated, relatively superposed, roadway route information strips, each of which has longitudinally successive indicia of a roadway route thereon, the roadway of which in actuality undergoes a turn at an intermediate point in the space between spaced points thereon. The spaced points and the intermediate point of the roadway are represented by the indicia, however, as lying on a rectilinear course of travel lengthwise of the strip; and the distances between the respective spaced points and the intermediate point of the roadway represented on the lower of the strips, are represented in accordance with different scales of distance lengthwise of the course of travel thereon. The strips have mutually coincident tooth engaging means thereon, at longitudinally successive intervals thereof; and the lower strip has longitudinally successive magnetic tracks thereon, coordinated with the change between the scales of distance thereon, to indicate the change in scale to an electromagnetic detection means used therewith. The scale of distance of the upper strip is the same as one of the scales of distance on the lower strip.

1 Claim, 8 Drawing Figures

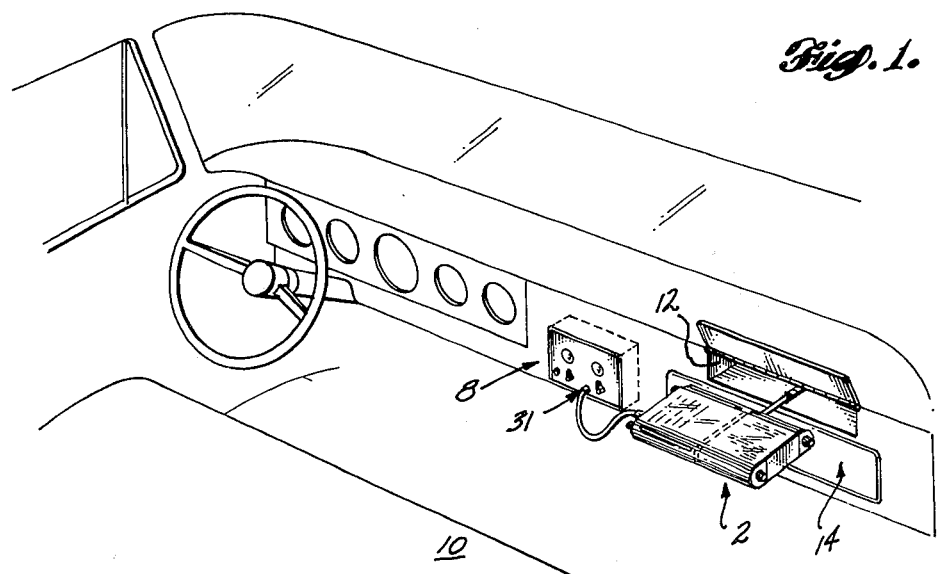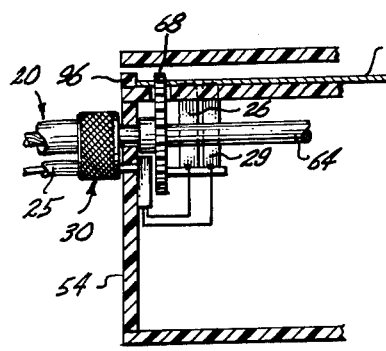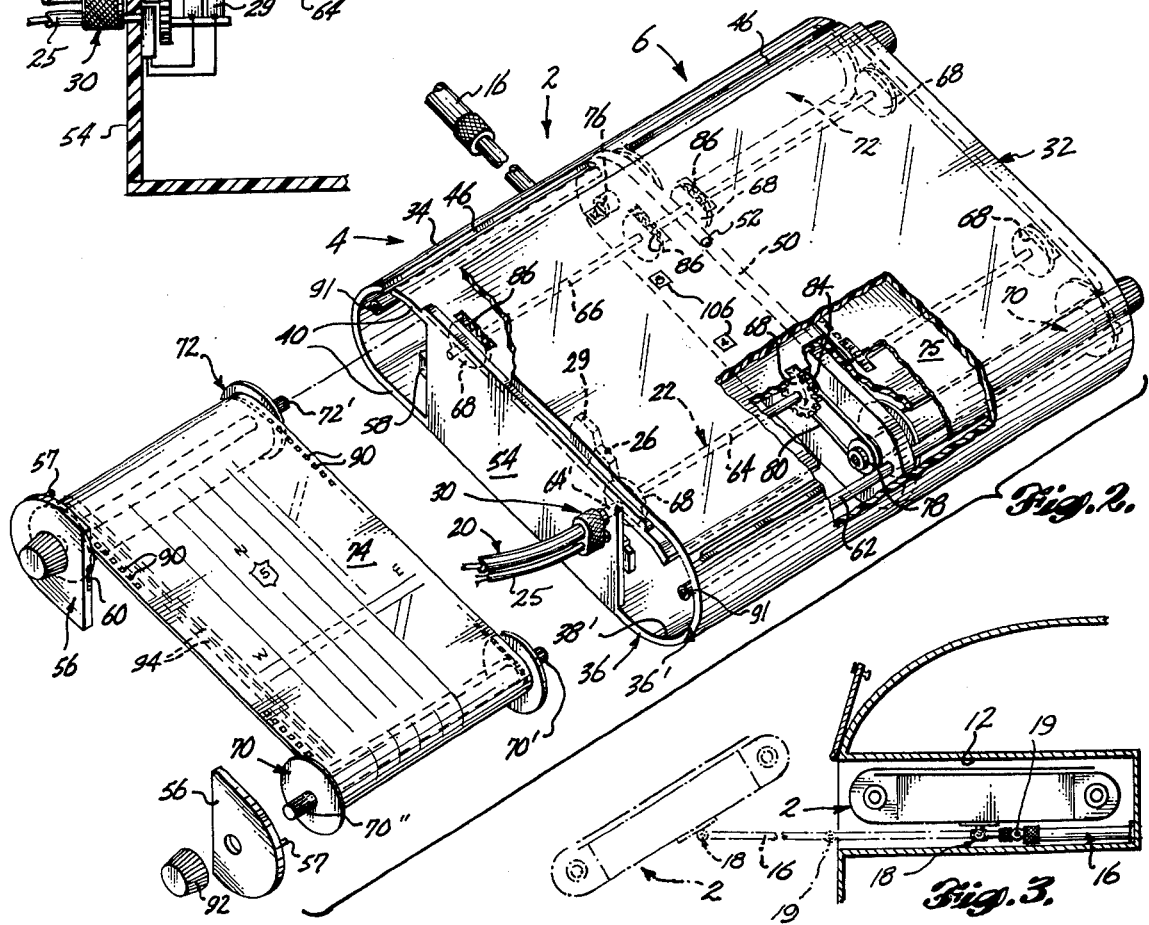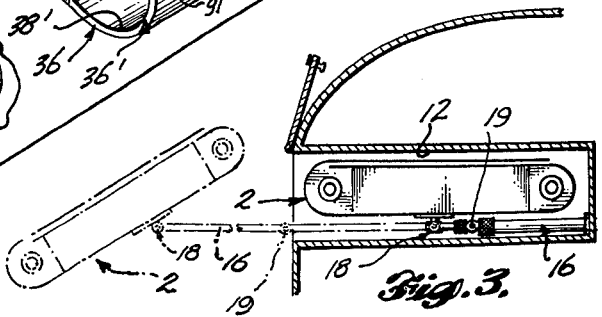

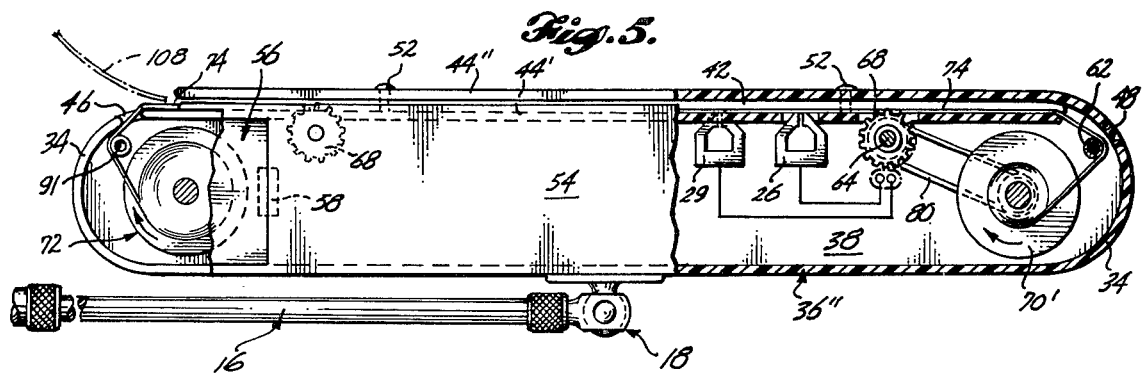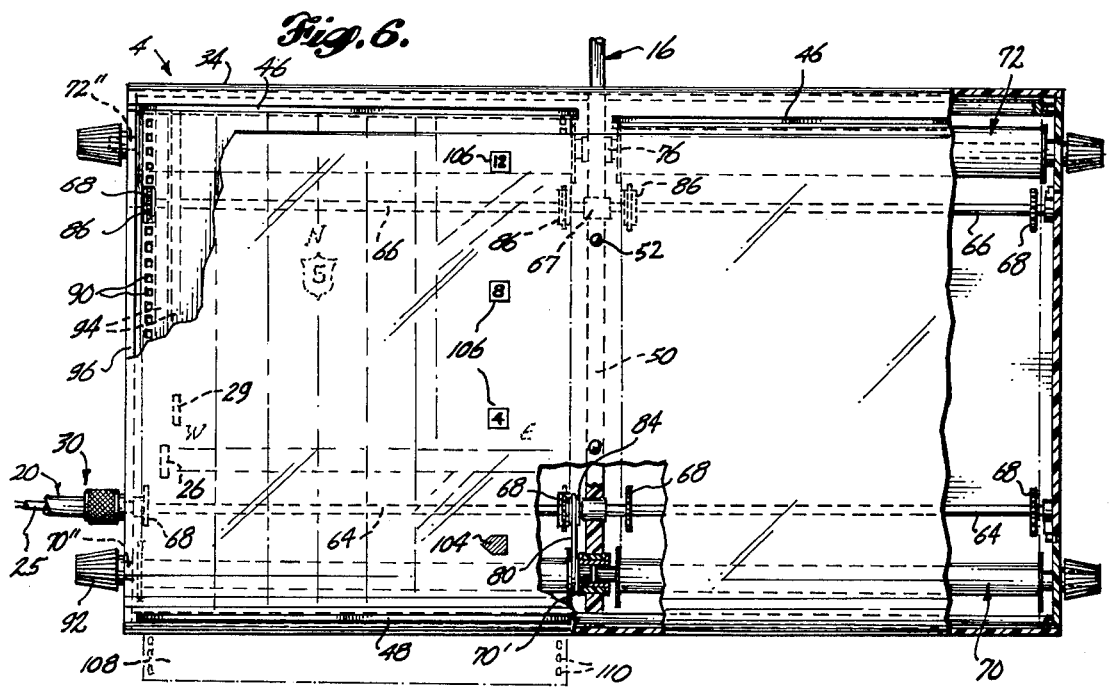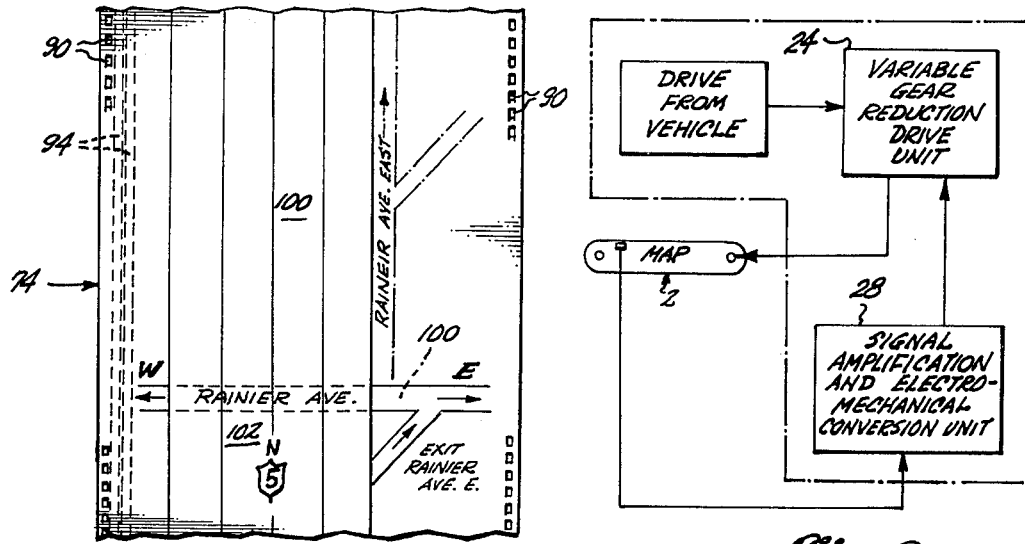

AUTOMATIC ROUTE INFORMATION DISPLAY

CROSS-REFERENCE TO RELATED APPLICATION:

This application is a division of a copending application entitled "Dashboard-Mounted Automatic Route Information Display Device," Charles Pelin, Ser. No. 265,647, filed June 23, 1972.

SUMMARY OF THE INVENTION

The present invention concerns improvements in the device disclosed in my U.S. Pat. No. 3,618,240, dated Nov. 9, 1971. The improvements produce many advantages, including greater ease of use, greater ease of storage, and greater safety and reliability to the user. They also produce advantages with respect to the ease and cost of manufacture. In particular, the improvements make it possible for the user to proceed along any given route, with the knowledge that he can anticipate turns and other such departures to be made on the route, and with the knowledge that although he may be making many such departures in reaching his destination, he can make them all while employing the same map throughout his journey. Alternatively, he may take a side trip from his main route, by introducing a second map which effectively overrides the map of his main route, until the side trip is completed. Other advantages will be apparent from the description of the invention which follows hereafter.

These advantages are realized by certain improvements of my invention wherein the variable gear reduction drive unit of my earlier device, is disposed together with the gear change means, in a paneled housing such as the dashboard of the vehicle, which is exposed to the cab of the vehicle for access to a seated passenger therein; and there are means on the profile face of the panel providing a dual coupling, one part of which is interconnected with the drive unit to impart a rotational force to a flexible rotary cable disposed in the cab, relatively outside of the housing, and the other part of which is interconnected with the gear change means to transmit electromagnetic signals to the same from the coupling. In this way, the route map display device itself may simply comprise a casing having an elongated slot viewable from points thereabove, and drive means interposed in the bottom of the slot to engage and drive a slotted elongated map-like route information strip, end to end thereof, between a pair of spooling points therebelow. The drive means is driven in turn by the rotary cable, and the cable may be connected to the coupling, either as a member which is a part thereof, or as a member which is releasably engageable with the drive unit at the coupling.

Also, the casing may have a pair of slots therein, oriented crosswise of the first mentioned slot, adjacent the ends thereof, to enable a second map-like route information strip to be superposed on the first mentioned strip, and driven by the drive means in conjunction therewith, between the pair of second mentioned slots. This is particularly true where each strip comprises an information portion having longitudinally successive indicia thereon of a roadway route, the roadway of which in fact undergoes turns over the route thereof, but which route is represented in straightline projection by the indicia on the portion, though perhaps in differing scales as to the distance between points in one longitudinal segment of the route, versus those in another such segment. For in such an instance, the strips may simply be provided with tooth engaging means at longitudinally successive intervals thereof and the drive means may include pairs of driven sprockets which are spaced apart on parallel axes in the slot, for engagement firstly, with the spooled strip, to drive it from one end of the slot toward the other, and moreover, with the second strip, to drive it in similar fashion, when it is superposed on the spooled strip, for example, to depart from the route of the spooled strip, onto a side route diverting therefrom. In addition, the spooled strip may have longitudinally successive magnetic tracks thereon, at locations coordinated with the change from the one segment of the route to the other, to enable an electromagnetic detection means to detect the change in scale, and to relay the fact to the gear change means in the housing of the vehicle, through the coupling on the panel thereof.

In the presently preferred embodiments of the device, the case is generally rectangular and transparently roofed, and has a recess therein for receipt of the spooled strip between opposite end portions thereof. A partition extends crosswise of the recess, and together with the roof defines a slot between the end portions of the case. The sprockets are rotatably mounted in the partition, and the case includes means for mounting the spools of the strip in the recess so that the map can be passed about the partition and engaged with the sprockets in the slot, there being a pair of slots in the end portions of the case for the overlap strip. The electromagnetic pickup means are also mounted in the partition, and are also operatively interconnected with the panel at the coupling by means of a flexible cable.

In one particular device, the case is fashioned from a slotted, elongated, integral strip of transparent plastic, the end portions of which are reentrantly folded into spaced parallel superposition with the center portion of the strip on one side thereof, to form an end to end recess between the longitudinal edges thereof; and moreover, are overlapped in spaced relationship with one another to form a shallow slot between the overlapping leaves thereof, which slot extends end to end of the case, and opens to the outside thereof along one bight portion of the case, and into the recess thereof along the other bight portion thereof. There is a second slot in the one bight portion of the case, oriented crosswise thereof, and opening into one longitudinal edge of the plastic strip to enable the spooled strip to be passed about the inner leaf of the plastic strip when the spools are mounted in the recess. There is also a third slot disposed interiorly of the other bight portion of the case, on a parallel with the second mentioned slot, to discharge the overlay strip when it has completed its journey through the slot between the leaves. A bulkhead extends across the recess inside the inner leaf, and an end wall is mullioned into the end opening of the recess defined by the one longitudinal edge of the strip, and is spaced apart from the bight portions thereof. There is a pair of sockets in the bulkhead opposite the spaces between the end wall and the bight portions of the plastic strip, for the spools of the spooled strip, as well as drive means mounted in the recess between the end wall and the bulkhead, for engagement with the latter strip and one of the spools, when the spools are socketed in the bulkhead with the strip extending therebetween in the first and second mentioned slots.

The drive means include an operatively driven shaft journaled in the end wall and the bulkhead and having sprockets fixed thereon which extend into the first mentioned slot, through fourth slots in the inner leaf. Preferably, the device also comprises a pair of bushed spindles that are cantilevered from the bulkhead opposite the spaces between the end wall and the bight portions, on parallels with the shaft, and at locations interposed between the sockets and the bight portions, so that the spooled strip may be passed about them also.

One end of the shaft projects outside of the case beyond the end wall, on the opposite side thereof from the bulkhead, and there are means on the shaft for coupling a flexible rotary drive cable to the same at the projecting end thereof, as indicated earlier. Also, the electromagnetic pickup means are positioned in the first mentioned slot, to detect signals magnetically recorded on the map, and to deliver each such signal to a point adjacent the projecting end of the shaft.

BRIEF DESCRIPTION OF THE DRAWINGS

These features will be better understood by reference to the accompanying drawings which illustrate one such device.

In the drawings,

FIG. 1 is a part perspective of the device in use;

FIG. 2 is an exploded, part cutaway perspective view of the device;

FIG. 3 is a part cross-sectional of the compartment for storing the device;

FIG. 4 is a part cross-sectional view of the device;

FIG. 5 is a similar view at right angles to that of FIG. 4;

FIG. 6 is a part cutaway plan view of the device;

FIG. 7 is a part plan view of a route map; and

FIG. 8 is a schematic view of the dashboard assembly in FIG. 1.

DESCRIPTION OF THE PREFERRED EMBODIMENT

Referring to the drawings, it will be seen that, as in my patent, the device 2 has a map display side 4 and a feature display side 6, and is mounted in the region of the dashboard 8 of a passenger vehicle, so that it can be viewed by an occupant or occupants of the vehicle while they sit on the front seat 10 of the vehicle. In the present instance, however, the device 2 is cantilevered from within a shallow, hinged-door compartment 12 which is disposed on the right-hand side of the dashboard, above the usual glove compartment 14. The device 2 is also retractable within the compartment 12 by virtue of being carried on a telescoping arm 16 which is extendable and retractable with respect to the recess of the compartment, so as to enable the device to be stowed in the compartment 12 when it is not in use. A universal joint 18 at the proximal end of the arm enables the device to assume either a horizontal position, or tilted positions with respect to the horizontal; and in addition, a second universal joint 19 at the distal end of the arm, enables the device to be swung laterally into view of the driver.

The device is driven through a flexible drive cable 20 which extends to the primary drive 22 of the device, from a variable gear reduction drive unit 24 housed in the dashboard, which drive unit 24 is driven in turn from the vehicle transmission or the vehicle speedometer cable, as in my patent. The drive cable 20 is accompanied by an electrical cable 25 which is adapted to carry signals in the reverse direction, from an electromagnetic pickup 26 in the device, to a signal amplification and electromechanical conversion unit 28 in the dashboard, which latter unit effects a mechanical gear change in the drive unit 24, when a change in map scale is detected by the pickup. The cable 25 may also carry one or more other signals from a second pickup 29, to control other mechanisms, such as a sound reproducing means (not shown) associated with the feature side 6 of the device, as explained in my patent. The cables 20 and 25 may be permanently interconnected between the device, and the units 24, 28 in the dashboard; or they may be adapted to be coupled or decoupled at one end, or at both ends, either from the device or from the dashboard units, such as by means of pairs of bijuncture hermaphroditic connectors 30 and 31, on the ends of the cable, and on the device and the dashboard of the automobile, respectively. Also, in either case, the cables may be stowable in the compartment 12 with the device.

The primary drive 22, the pickups 26 and 28, and the other inboard operating components of the device, are housed in a plastic case 32 which is generally rectangular in plan view, but rounded about the longitudinal edges 34 thereof, in latitudinal cross section. The case is fabricated in part from a slotted, elongated, integral, heat-formed strip 36 of transparent plastic, the end portions 36' of which are reentrantly folded into spaced, parallel superposition with the center position 36'' of the strip on one side thereof, to form an end to end recess 38 between the longitudinal edges 40 thereof. In addition, the end portions 36' of the strip are overlapped in spaced relationship with one another, to form a shallow slot 42 between the overlapping leaves 44' and 44'' thereof, which slot extends end to end of the case, and opens to the outside thereof along the left-hand fold or bight portion 34 of the case in FIG. 5, and into the recess 38 along the right-hand bight portion 31 thereof. Two 46 of the slots in the strip itself are oriented crosswise thereof and are disposed in opposite edges 40 thereof, in slightly staggered relationship to one another, to occupy the left-hand bight portion 34 of the case. Two 48 of the remaining slots are also so oriented, but are disposed interiorly of the strip, and in crosswise alignment with one another, to occupy the right-hand bight portion 34 of the case.

The case 32 otherwise comprises a plate 50 of plastic, having a prolate cross section corresponding to that of the recess 38. The plate is inserted in the recess, and fused or otherwise bonded to the strip 36, in the latitudinal median plane thereof, to form a bulkhead across the recess. In addition, a pair of spacer studs 52 are interposed in the slot 42, and bonded to the leaves 44' and 44'', above the bulkhead 50, to rigidify the case; and moreover, the ends of the case are reinforced by a pair of rectangularly-shaped plates 54, which are mullioned into the end openings 38' of the recess 38, and bonded to the center portion 36'' of the strip at the bottom, and to the inner leaf 44' of the strip at the top. In use, moreover, the remaining part-rounded segments of the openings 38' are closed by pairs of apertured end caps 56, which have laterally projecting pins 57 thereon, and are retained in the openings by sets of magnets 58 and metal slugs 60 on the plates 54 and the caps 56, respectively.

The bulkhead 50 also serves as a mounting block for a pair of bushed, spaced, parallel spindles 62, and a pair of sprocketed, spaced, parallel, drive and idler shafts 64 and 66, which spindles and shafts are, respectively, fixedly and rotatably mounted in the bulkhead 50, substantially full length of the recess 38, there being bearings 67 for the shafts in the bulkhead. The spindles 62 are located so as to cantilever from the bulkhead, opposite the segmental openings 38" of the recess; whereas the shafts 64 and 66 are located opposite the end plates 54, and are also journaled in the end plates, there being a pair of sprockets 68 on each shaft, on each side 4 or 6 of the case, one of which pair is disposed adjacent the bulkhead, and the other of which is disposed adjacent the nearby end plate or wall 54.

When the device is in use, moreover, the bulkhead 50 serves as a journal block for pairs of end-projected, take-up and carrier spools 70 and 72 which are inserted in the recess 38, through the end openings 38' thereof, to support either a longitudinally serially slotted, magnetically-tracked strip map 74, or a similarly equipped feature strip 75, in wound condition therebetween. When inserted, the splined, projected distal or forward end portions 72' of the carrier spools 72 are received in a complementally splined, double socketed bearing 76 that is journaled in the bulkhead 50 between the idler shaft 66 and the left-hand spindle 62. The splined, projected forward end portions 70' of the take-up spools 70 are received in a complementally splined, double socketed pulley 78 that is journaled in the bulkhead on the map side of the case, between the drive shaft 64 and the right-hand spindle 62. The pulley is driven by a belt 80 which extends within the same side of the case, to and from another pulley 84 on the drive shaft 64. The shaft 64 is driven in turn by the cable 20, through the fact that the proximal end portion 64' of the shaft on the map side of the case, projects outwardly through the adjacent end wall 54, and is splined at the end to couple with the female connector 30 on the adjacent end of the cable 20.

The map 74 and strip 75 are driven by the sprockets 68, which extend up through slots 86 in the inner leaf 44' of the case, and engage the drive slots 90 of map in the slot 42. This follows from the fact that when the spools 70 and 72 are inserted in the case, the map 74 (or strip 75) is released slightly from the spools, and not only passed about the bushings of the spindles 62, but also upwardly through the slot 46, about the inner leaf 44' of the case. At the same time, moreover, the end caps 56 are slipped over the splined, projecting proximal ends 70" and 72" of the spools, and are inserted in the openings 38' of the case, and abutted with the magnets 58, the pins 57 meanwhile engaging in the sockets 91 formed by the ends of the bushings on the spindles 62. In addition, a pair of knobs 92 is engaged with the ends 70" and 72", to enable the user to apply tension to the map for purposes of preparing it for the map reading operation.

During such operation, the magnetic pickups 26 and 29 detect any change in scale recorded on the magnetic strip 94 of the map, and provide a signal, or signals, to the dashboard assembly 26, 28, through the cable 25.

Preferably, the end openings of the slot 42 are closed in part by a pair of ribs 96 which are upstanding on the edges 40 of the inner leaf 44' to act as edge guides for the map in the sprocket-engaged condition thereof.

An electric motor (not shown) may be provided in the compartment 12 for rewinding the carrier spool 70, when it is desired or necessary to do so. In such a case, the knob 92 on the end 70" of the spool is removed, and the arbor of the motor is splined to the end for this purpose.

In addition to being imprinted in differing scales, the route information on the map is presented in straight-line projection, so that while the route depicted may require the driver to undergo a 90° turn, or otherwise, the new section of roadway that he experiences after the turn, is depicted on the map as a straight-line prolongation of the section of roadway from which he made the turn. However, accompanying intelligence indicates the fact that he is now embarking on the new section, and of course, he will continue on the same until another turn is made and a third section is encountered.

For example, within a city each right or left hand turn is likely to put the driver on a street of different name, and this name is indicated on the new section of roadway, notwithstanding that the new section is a straight-line projection of the roadway from which he made the turn. In the illustration of FIG. 7, for example, the driver turns onto section 100 from section 102, and the 90° intersection of Interstate Thruway 5 North with respect to Rainier Ave., is so indicated. But on the map, Rainier Ave. is a straight-line prolongation of Interstate 5.

In this way, the indexing of the map can be a direct function of the distance traveled, notwithstanding that the course of travel is a zig-zag one, involving many turns. Moreover, because of this direct relationship, the driver can alert himself to each turn, and to the number of miles ahead at which to expect it, by observing scaled distances 106 imprinted on the case with respect to "you are here" marker 104 therebelow. Differences in scale are taken into account by providing intelligence (not shown) on the map, indicating the multiple (or fraction) of the distances 106 applicable to that portion of the map then in view.

Other intelligence (not shown) may indicate turnoffs which can be made from any section of the route, and points of interest therebeyond.

Furthermore, should the driver choose to make a diversion from the main route of the map 74, he can continue to use the device by overlaying a similarly slotted diversion strip 108 on the main map, in the slot 42, when the point of diversion arrives at 104 on the map. As seen in FIG. 5, the diversion strip is introduced into the slot above the left-hand bight-portion 34 of the case, and is advanced until the drive slots 110 of the same engage the teeth of the sprockets 68 of the idler shaft 66, whereupon the diversion strip is driven forward with the main map, in superposition thereon, and is ultimately driven out of the slot 48 along the right-hand bight portion 34 of the case. Similarly, a driver interested in information pertaining to a road which branches off to one side of the map, such as information relating to food and lodging on the side road, can add a diversion overlay to the feature side of the device and this overlay will give him the information in appropriate sequence, inasmuch as the overlays 108 are keyed to the scale of the segment of main map (or feature strip) riding thereunder. Alternatively, such a feature overlay may be employed without a strip 75 underlying it.

What is claimed is:

1. In an automatic route information display device, a pair of elongated, relatively superposed roadway route information strips, each having longitudinally successive indicia of a roadway route thereon, the roadway of which route in actuality undergoes a turn at an intermediate point in the space between spaced points thereon, but said spaced points and said intermediate point of said roadway being represented by the indicia as lying on a rectilinear course of travel lengthwise of the strip, and the distances between the respective spaced points and the intermediate point of the roadway represented on the lower of the strips, being represented in accordance with different scales of distance lengthwise of the course of travel thereon, mutually coincident tooth engaging means on the strips at longitudinally successive intervals thereof, and longitudinally successive magnetic tracks on the lower strip, coordinated with the change between the scales of distance thereon, to indicate the change in scale to an electromagnetic detection means used therewith, the scale of distance of the upper strip being the same as one of the scales of distance on the lower strip.

* * * * *